(12) United States Patent
Kannler

(10) Patent No.: US 10,691,841 B2
(45) Date of Patent: Jun. 23, 2020

(54) ELECTRICAL DEVICE AND HOUSING FOR AN ELECTRICAL DEVICE

(71) Applicant: Fujitsu Client Computing Limited, Kawasaki (JP)

(72) Inventor: Bernhard Kannler, München (DE)

(73) Assignee: Fujitsu Client Computing Limited, Kawasaki (JP)

( * ) Notice: Subject to any disclaimer, the term of this patent is extended or adjusted under 35 U.S.C. 154(b) by 0 days.

(21) Appl. No.: 16/269,217

(22) Filed: Feb. 6, 2019

(65) Prior Publication Data

US 2019/0251299 A1    Aug. 15, 2019

(30) Foreign Application Priority Data

Feb. 15, 2018  (DE) .................. 10 2018 103 450

(51) Int. Cl.
*G06F 21/86* (2013.01)
*G06F 1/18* (2006.01)
*G08B 13/14* (2006.01)

(52) U.S. Cl.
CPC ............. *G06F 21/86* (2013.01); *G06F 1/181* (2013.01); *G06F 1/182* (2013.01); *G08B 13/149* (2013.01)

(58) Field of Classification Search
CPC .......... G06F 21/86; G06F 1/181; G06F 1/182; E05B 73/0082
See application file for complete search history.

(56) References Cited

U.S. PATENT DOCUMENTS

| | | | |
|---|---|---|---|
| 5,406,261 A | 4/1995 | Glenn | |
| 5,912,621 A * | 6/1999 | Schmidt .................. | G06F 21/86 340/571 |
| 5,945,915 A * | 8/1999 | Cromer .................. | G06F 1/181 340/568.1 |
| 6,014,747 A | 1/2000 | Fackenthall et al. | |
| 6,111,505 A * | 8/2000 | Wagener ................ | G06F 21/86 340/545.6 |
| 6,289,456 B1 * | 9/2001 | Kuo ........................ | G06F 21/51 726/34 |
| 7,716,503 B2 * | 5/2010 | Chang ..................... | G06F 1/325 312/223.1 |
| 9,152,826 B2 * | 10/2015 | Zhang ..................... | G06F 21/88 |
| 9,460,605 B2 | 10/2016 | Köhler et al. | |
| 2008/0148074 A1 | 6/2008 | Chang et al. | |
| 2013/0321162 A1 * | 12/2013 | Kohler .................... | G06F 1/181 340/686.1 |
| 2014/0325688 A1 * | 10/2014 | Cashin .................... | G06F 21/86 726/34 |

FOREIGN PATENT DOCUMENTS

| DE | 201 21 432 U1 | 9/2002 |
|---|---|---|
| DE | 698 11 438 T2 | 12/2003 |
| DE | 10 2010 052931 B3 | 3/2012 |

* cited by examiner

*Primary Examiner* — Nidhi Thaker
(74) *Attorney, Agent, or Firm* — DLA Piper LLP (US)

(57) ABSTRACT

An electrical device includes a housing with a first and at least one second opening state, an opening detector, and a first installation position and at least one second installation position for the opening detector, wherein the opening detector, if it is arranged on the first installation position, detects the first, as well as the at least one second opening state, and the opening detector, if it is arranged on the at least one second installation position, only detects the at least one second opening state.

8 Claims, 3 Drawing Sheets

– 9 switch
10 first bracket
11 button
12 lateral wall
13 system board
14 cooling element
15 hard drive bracket
16 spring tab
17 protrusion
19 second bracket
20 plug connector
21 mating plug connector
22 pin
23 hole
24 switch housing
25 cable
26 fastening foot
A front region of the computer
B rear region of the computer
C edge region of the horizontal part of the front cover
X, Y direction

ELECTRICAL DEVICE AND HOUSING FOR AN ELECTRICAL DEVICE

TECHNICAL FIELD

This disclosure relates to an electrical device, in particular a computer, including a housing and an opening detector, and a housing for an electrical device, in particular for a computer.

BACKGROUND

Electrical devices with housings monitored by opening detectors are known. Such opening detectors are, among other things, used to register an unauthorized opening of the housing, and thus an unauthorized access to sensitive components of the electrical device and sensitive data. It is disruptive, however, to an operation of such electrical devices if an authorized opening of the housing, for example, for maintenance of individual components of the electrical device, always triggers an alarm.

SUMMARY

I provide an electrical device including a housing with a first and at least one second opening state, an opening detector, and a first installation position and at least one second installation position for the opening detector, wherein the opening detector, if it is arranged on the first installation position, detects the first, as well as the at least one second opening state, and the opening detector, if it is arranged on the at least one second installation position, only detects the at least one second opening state.

I also provide a housing for an electrical device, including a first and at least one second housing cover and a first and at least one second installation position for an opening detector, wherein an opening detector attachable to the housing at the first installation position such that an at least partial removal of the first as well as of the at least one second housing cover is detectable, and an opening detector attachable to the housing at the at least one second installation position such that only an at least partial removal of the at least one second housing cover is detectable if an opening detector is attached to the at least one second installation position.

Figure 1:
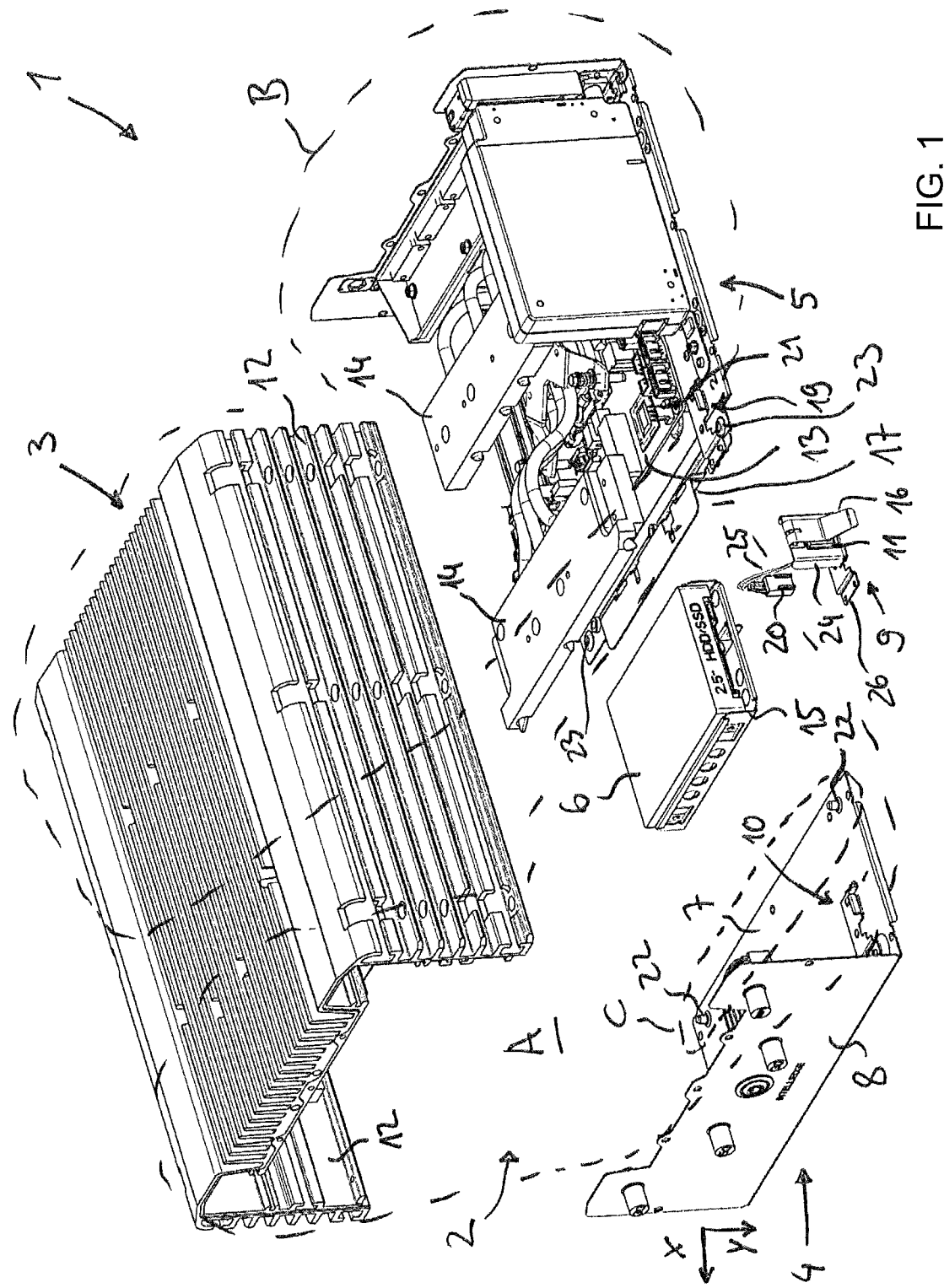
FIG. 1 shows an exploded view of a computer according to an example.

LIST OF REFERENCE CHARACTERS 1 computer
2 housing
3 U-shaped lid
4 L-shaped front panel
5 housing floor
6 hard drive
7 horizontal part of the front panel
8 vertical part of the front panel

DETAILED DESCRIPTION

My electrical device, in particular a computer, may include a housing with a first and at least one second opening state. The electrical device may further include an opening detector. The electrical device may comprise a first installation position and at least one second installation position for the opening detector. The opening detector, if it is arranged on the first installation position, detects the first, as well as the at least one second opening state. If the opening detector is arranged on the at least one second installation position, the opening detector only detects the at least one second opening state.

It is advantageous that the opening detector can be arranged on the first or the second installation position, as required. In this way, it is possible, through selection of the installation position for the opening detector, to detect only the at least one second opening state, or the first as well as the at least one second opening state.

Different opening states of the housing are, for example, characterized in that different housing openings of the housing are opened or closed, or a housing opening of the housing is opened to different widths. In this way, components of the electrical device, which can be physically accessed in the first opening state can, for example, be maintained or exchanged if the opening detector is arranged on the second installation position without the opening detector detecting an unauthorized opening of the housing.

The first opening state may permit access to a first region of the electrical device, and the at least one second opening state to at least one second region of the electrical device. For example, a hard drive may be arranged in the first region so that, if the opening detector is arranged on the first installation position, physical access to the hard drive is detected, whereas, if the opening detector is arranged on the second installation position, physical access to the hard drive is not detected.

The first region of the electrical device may be spatially separated from the at least one second region of the electrical device. In this way, it is ensured that a physical intervention concerning the at least one second region of the electrical device is not possible if the device is in the first opening state, i.e. access is only permitted to the first region.

The housing may include a first housing cover and a housing floor. The opening detector may be arranged on the first housing cover if the detector is attached to the first installation position. The first housing cover or the housing floor may comprise at least one pin extending in a first direction. Correspondingly, the housing floor or the first housing cover may comprise at least one hole. When the first housing cover is closed, the at least one pin engages in the at least one hole so that pulling out the first housing cover in a second direction perpendicular to the first direction is prevented.

A certain direction to open the first housing cover is provided through the direction in which the at least one pin extends. In particular, the specified direction is selected such that a manual blocking of the opening detection switch is not possible when opening the first housing cover or is at least made difficult, for example, in that a direction is selected as the specified direction to open the first housing cover in which direction the opening detector already triggers if the first housing cover is moved only a few millimeters in this direction.

The electrical device may further include a device to assess a state of the opening detector, which device is configured to cause at least one of the following events, depending upon the opening state detected by the opening detector:
a visual, auditory, or other alarm,
an entry in a log, or
an intervention concerning a power supply or a further component of the electrical device.

The state of the opening detector corresponds to the opening state of the housing detected by the opening detector. An intervention concerning a power supply can, for example, include switching off a power pack of the electrical device.

The device may cause different events to assess the state of the opening detector depending upon whether the opening detector is arranged on the first installation position or the at least one second installation position. It is advantageous that different events can be generated, depending upon whether the entire electrical device, for example, or only a region of the electrical device is monitored by the opening detector. The installation position used can be stored, for example, in a non-volatile memory of the device for assessment, together with associated events to be caused.

My housing for an electrical device, in particular a computer, may comprise a first and at least one second housing cover. The housing may further comprise a first and at least one second installation position for an opening detector. An opening detector is attachable to the housing at the first installation position such that at least a partial removal of the first, as well as of the second housing cover is detectable. An opening detector is attachable to the housing at the at least one second installation position such that only an at least partial removal of the at least one second housing cover is detectable if an opening detector is attached to the at least one second installation position.

Further advantages are described in the subsequent description of examples. The examples are described based on the following figures.

FIG. 1 shows an exploded view of a computer 1 according to an example. The computer 1 has a housing 2. The housing 2 includes a reversed U-shaped lid 3, an L-shaped front panel 4 and a housing floor 5. The reversed U-shaped lid 3 is arranged above the housing floor 5. The front panel 4 can be fastened to the lid 3 and the housing floor 5 by screws (not shown), for example. On lateral walls 12 of the lid 3 perpendicular to the housing floor 5, the lid 3 can be fastened to the housing floor 5 by screws (not shown). Components of the computer 1 such as, for example, a system board 13, cooling elements 14 and a hard drive 6 are arranged between the housing floor 5 and the lid 3.

The hard drive 6 is arranged in a front region A of the computer 1. The front region A of the computer 1 is located on a side of the computer 1 on which the housing 2 can be closed by the L-shaped front panel 4. The front region A is in particular the region of the computer 1, to which a user gains access if the front panel 4 is at least partially opened.

The front region A is spatially separated from a rear region B through a protrusion 17 of the housing floor 5. The rear region B is in particular the region of the computer 1 to which the user gains access if the lid 3 is at least partially opened. The system board 13, for example, is arranged in the rear region. The protrusion 17 projects perpendicularly from the housing floor 5 into an interior of the housing 2 and is configured in an L-shape. The hard drive 6 is supported in a hard drive bracket 15. The hard drive bracket 15 is fastenable to the protrusion 15 of the housing floor 5 by screws, for example.

The front panel 4 comprises a horizontal part 7 and a vertical part 8. If the front panel 4 is fastened to the housing floor 5, the horizontal part 7 of the front panel 4 thus substantially lies in a plane with the housing floor 5. The vertical part 8 of the front panel 4 stands substantially perpendicularly to the horizontal part 7 of the front panel 4. A first bracket 10 is located on the horizontal part 7 of the front panel 4, on which an opening detector in the form of a switch 9 for the detection of an opening of the housing 2 can be fastened by screws, for example.

Two pins 22 are arranged on an edge region C of the horizontal part 7 of the front panel 4 facing the housing floor 5. The pins 22 project substantially perpendicularly, from the horizontal part 7 of the front panel 4, into the interior of the housing 2. Two holes 23 are arranged on the housing floor 5, into which holes the pins 22 are inserted if the front panel 4 is fastened to the housing floor 5. This prevents a pulling-out of the front panel in a direction X perpendicular to the surface of the vertical part 8 of the front panel 4. The front panel 4 must thus be able to be separated from the housing floor 5, moved downwardly, at least to such an extent in a direction Y counter to a direction of extension of the pins 22 until the holes 23 release the pins 22.

A second bracket 19 for the switch 9 is attached to the housing floor 5. The example of the second bracket 19 resembles the example of the first bracket 10 so that the switch 9 can selectively be fastened to the first or the second bracket 10, 19. The attachment of the switch 9 to the first bracket 10 represents a first system configuration of the computer 1 described in detail with reference to FIG. 2. The attachment of the switch 9 to the second bracket 19 represents a second system configuration of the computer 1 described in detail with reference to FIG. 3.

Figure 4:
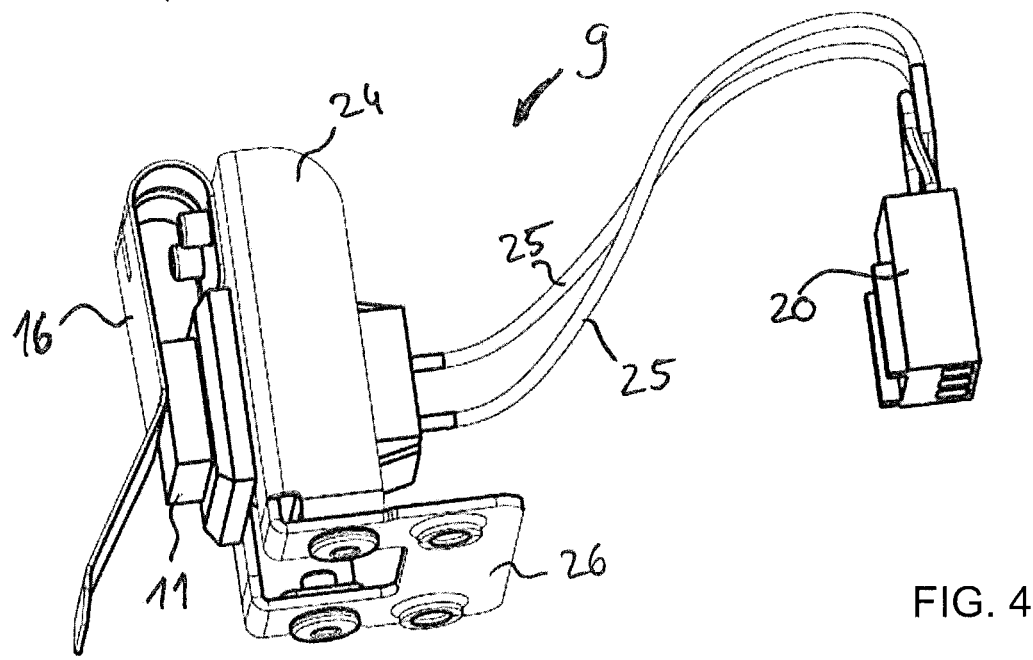
FIG. 4 shows a perspective view of a switch that detects an opening of a housing according to an example.

The switch 9, as it is utilized in this example, is shown in detail in FIG. 4. The switch 9 comprises a button 11, a spring tab 16, a plug connector 20 and a switch housing 24. The plug connector 20 is connected with the button 11 via cable 25. A fastening foot 26 is arranged on a lower end of the switch housing 24 by which foot the switch 9 can be fastened to the first bracket 10. The spring tab 16 is fastened, with a first end of the tab 16, to an upper end of the switch housing 24. The spring tab 16 extends over the button 11 and, at a free second end, is angled pointing away from the button 11. If a force acts on the spring tab 16 in the direction of the button 11, the spring tab 16 thus presses the button 11. Switches of any configuration or other opening detectors can, of course, be used analogously.

In the first, as well as in the second system configuration, a lateral wall 12 of the lid 3 acts upon the spring tab 16 of the switch 9, and thus activates the button 11 if the housing 2 is completely closed. If the lateral wall 12 releases the spring tab 16, an opening of the housing 2 is detected.

A 4-pin mating plug connector 21 is attached to the system board 13, to which connector the plug connector 20 of the switch 9 is connected, independently of whether the switch 9 is fastened to the first or the second bracket 10, 19. Via the plug connection 20, 21, a state of the switch 9 is assessed by the system board 13.

Figure 2:
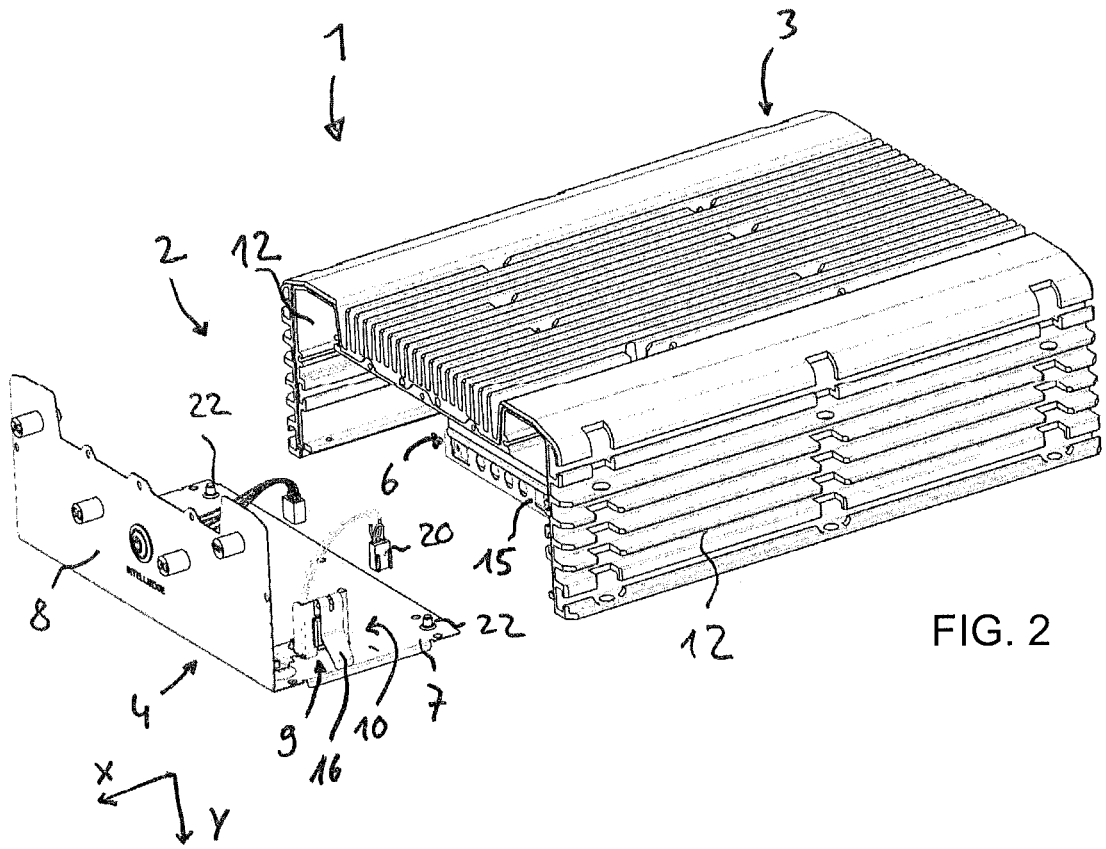
FIG. 2 shows a perspective view of the computer according to FIG. 1 in a first system configuration.

FIG. 2 shows the computer 1, in the example according to FIG. 1, in the first system configuration, i.e. the switch 9 is fastened to the first bracket 10. The housing 2 is in a first opening state in FIG. 2. This first opening state is characterized in that the L-shaped front panel 4 is separated from the housing floor 5 and the lid 3. In this first opening state, the lid 3 is fastened to the housing floor 5 not visible in this figure.

The first opening state allows a user physical access to the front region A of the computer 1, and thus in particular to the hard drive bracket 15 and the hard drive 6 supported therein. This first opening state does not, however, allow physical access to the components of the computer 1 lying in the rear region B such as, for example, the system board 13. The front region A is spatially separated from the rear region B through a protrusion 17 so that a grasping from the side of the front panel 4 through the front region A into the rear region 6 is not possible, or only a very limited way.

Since the switch 9 is fastened to the first bracket 10 in the first system configuration shown in FIG. 2, the switch 9 is triggered as soon as the front panel 4 is detached from housing floor 5 and the lid 3. In addition, the switch 9, in this first system configuration, triggers if the front panel 4 is fastened to the housing floor 5, but the lid 3 is removed. In the first system configuration, as it is shown in FIG. 2, any opening of the housing 2 by removal of the front panel 4 or the lid 3 is thus detected through a change of state of the switch 9. In this way, in particular physical access to the front region A, as well as to the rear region B is detected.

A manipulation of the switch 9 is made more difficult in that, as described with reference to FIG. 1, the front panel 4 must initially be detached in direction Y from the housing floor 5. The free end of the spring tab 16 is in a closed housing 2 in contact with the lateral wall 12 so that a force acts upon the button 11. The free end of the spring tab 16 contacts the lateral wall 12 directly above the horizontal part 7 of the front panel 4 so that, even in a slight lifting of the lid 3 or lowering of the front panel 4 in direction Y, the lateral wall 12 releases the spring tab 16 and thus the switch 9 triggers. A manual blocking of the button 11 or the spring tab 16, after the housing 2 is opened a few millimeters, to avoid a triggering of the switch 9, is thus made significantly more difficult.

Figure 3:
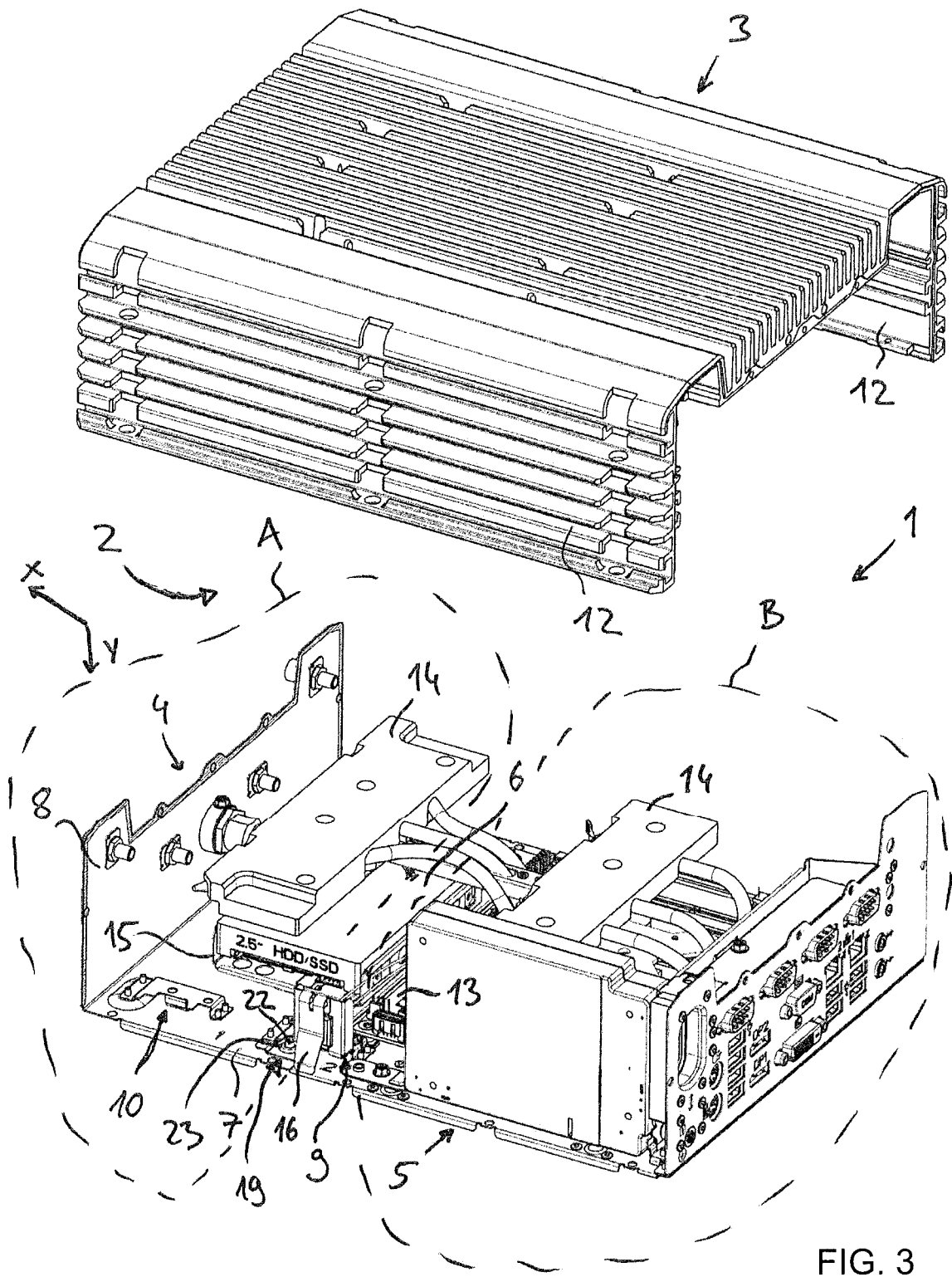
FIG. 3 shows a perspective view of the computer according to FIG. 1 in a second system configuration.

FIG. 3 shows the computer 1 in the example according to FIG. 1 in the second system configuration, i.e. the switch 9 is fastened to the second bracket 19. The housing 2 is shown in a second opening state in FIG. 3. In the second opening state, the front panel 4 is fastened to the housing floor 5, and the lid 3 is separated from the housing floor 5 and the front panel 4.

The second opening state allows a user physical access to the front region A and the rear region B of the computer 1, and thus in particular to the hard drive 6, as well as to the system board 13 and components attached thereupon such as, for example, a main memory and processor not recognizable here.

Since the switch 9 is fastened to the second bracket 19 in the second system configuration shown in FIG. 3, the switch 9 is only triggered if the lid 3 is detached from the housing floor 5. In this second system configuration, the front panel 4 can be removed without the switch 9 being triggered as long as the lid 3 remains fastened to the housing floor 5. In the second system configuration as shown in FIG. 3, only an opening of the housing 2, through removal of the lid 3 is thus detected through a change of state of the switch 9. In this way, an opening of the housing 2 is only detected if physical access to the front region A and the rear region B, i.e. to the entire computer 1 in this example, occurs simultaneously. In other words, physical access to the hard drive 6, if it happens via a removal of the front panel 4, is not detected in the second system configuration. The first opening state can thus be adopted in the second system configuration without the switch 9 triggering.

Further examples and configurations are, of course, possible. In particular, a computer with more than two system configurations can be used. In such an example, the computer comprises three or more brackets to which a switch to detect an opening of a housing of the computer can be fastened. In this way, three and more opening states of the housing can be detected. For example, there is a system configuration in which any opening of the housing is detected, and further system configurations in which independent partial regions of the housing are monitorable, or in which ever-increasingly smaller partial regions of the total region of the housing are monitorable depending upon arrangement of the switch.

In a further alternative example of a computer, a first bracket and a second bracket for a switch for detection of an opening of a housing are attached to a front panel as shown, for example, in FIG. 1. For example, both brackets are attached to the horizontal part of the front panel, the first nearer to the vertical part of the front panel than the second. Alternatively, the first bracket is attached to the vertical part and the second bracket to the horizontal part of the front panel. In these examples, an opening of the housing can be detected based upon how far the front panel is opened dependent upon whether the switch is fastened to the first or the second bracket.

What is claimed is:

1. An electrical device comprising:
   a housing with a first and at least one second opening state,
   an opening detector, and
   a first installation position and at least one second installation position for the opening detector, wherein
   the opening detector, if it is arranged on the first installation position, detects the first, as well as the at least one second opening state,
   the opening detector, if it is arranged on the at least one second installation position, only detects the at least one second opening state,
   the housing includes a first housing cover and a second housing cover arranged adjacent to the first housing cover,
   in the first opening state, the first housing cover is at least partially opened and in the second opening state, the second housing cover is at least partially opened, and
   the opening detector, at the first a don position, is arranged on the first lung cover such that the second housing cover acts upon the opening detector only if the first, as well as the second housing cover is closed, and
   the electrical device further comprises a housing floor, wherein the opening detector, at the second installation position, is arranged on the housing floor such that the second housing cover acts upon the opening detector only if the second housing cover is closed.

2. The electrical device according to claim 1, wherein the first opening state permits access to a first region (A) of the electrical device, and the at least one second opening state permits access to at least one second region (B) of the electrical device.

3. The electrical device according to claim 2, wherein the first region (A) of the electrical device is spatially separated from the at least one second region (B) of the electrical device.

4. The electrical device according to claim 1, wherein the first housing cover or the housing floor comprises at least one pin extending in a first direction and, correspondingly, the housing floor or the first housing cover comprises at least one hole, and the at least one pin, when the first housing cover is closed, engages into the at least one hole so that a pulling-out of the first housing cover in a second direction, substantially perpendicular to the first direction, is prevented.

5. The electrical device according to claim 1, further comprising a system board arranged in the housing, wherein the system board comprises a mating plug connector with which a plug connector of the opening detector is electrically connected if the opening detector is arranged on the first installation position as well as if the opening detector is arranged on the at least one second installation position.

6. The electrical device according to claim 1, further comprising a device that assesses a state of the opening detector, which device is configured, depending upon the opening state detected by the opening detector, to cause at least one of:
    a visual, auditory, or other alarm,
    an entry in a log, or
    an intervention concerning a power supply or a further component of the electrical device.

7. The electrical device according to claim 6, wherein the device that assesses the state of the opening detector causes different events depending upon whether the opening detector is arranged on the first or the at least one second installation position.

8. The electrical device according to claim 1, which is a computer.

* * * * *

UNITED STATES PATENT AND TRADEMARK OFFICE
CERTIFICATE OF CORRECTION

| | | |
|---|---|---|
| PATENT NO. | : 10,691,841 B2 | Page 1 of 1 |
| APPLICATION NO. | : 16/269217 | |
| DATED | : June 23, 2020 | |
| INVENTOR(S) | : Kannler | |

It is certified that error appears in the above-identified patent and that said Letters Patent is hereby corrected as shown below:

In the Claims

<u>In Column 6</u>
Lines 62 to 63, please change "at the first a don position, is arranged on the first lung cover" to -- at the first installation position, is arranged on the first housing cover --.

Signed and Sealed this
Seventeenth Day of November, 2020

Andrei Iancu
*Director of the United States Patent and Trademark Office*